(12) United States Patent
Kilpatrick et al.

(10) Patent No.: US 9,070,208 B2
(45) Date of Patent: Jun. 30, 2015

(54) ACCELERATED SUBSURFACE SCATTERING DETERMINATION FOR RENDERING 3D OBJECTS

(75) Inventors: Charlie A. Kilpatrick, San Francisco, CA (US); Clifford Ramshaw, San Rafael, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 796 days.

(21) Appl. No.: 13/118,315

(22) Filed: May 27, 2011

(65) Prior Publication Data

US 2012/0299914 A1     Nov. 29, 2012

(51) Int. Cl.
    *G06T 15/00*          (2011.01)
    *G06T 19/00*          (2011.01)

(52) U.S. Cl.
    CPC ...................................... *G06T 19/00* (2013.01)

(58) Field of Classification Search
    None
    See application file for complete search history.

(56) References Cited

U.S. PATENT DOCUMENTS

| | | | | |
|---|---|---|---|---|
| 7,106,327 | B2 * | 9/2006 | Narasimhan et al. | 345/426 |
| 7,250,974 | B2 * | 7/2007 | Koyanagi | 348/345 |
| 7,386,164 | B2 | 6/2008 | Shragai et al. | |
| 7,982,734 | B2 | 7/2011 | Miller | |
| 8,207,968 | B1 * | 6/2012 | Krishnaswamy et al. | 345/426 |
| 8,638,331 | B1 | 1/2014 | Jarosz et al. | |
| 2002/0171633 | A1 * | 11/2002 | Brinjes | 345/168 |
| 2002/0174405 | A1 * | 11/2002 | Janssen | 716/3 |
| 2003/0001841 | A1 * | 1/2003 | Malzbender et al. | 345/424 |
| 2004/0037068 | A1 * | 2/2004 | Patterson et al. | 362/147 |
| 2005/0035965 | A1 * | 2/2005 | Sloan et al. | 345/426 |
| 2008/0001947 | A1 * | 1/2008 | Snyder et al. | 345/426 |
| 2009/0010495 | A1 | 1/2009 | Schamp et al. | |
| 2009/0033661 | A1 | 2/2009 | Miller | |
| 2009/0096807 | A1 * | 4/2009 | Silverstein et al. | 345/593 |
| 2009/0109221 | A1 * | 4/2009 | Planck et al. | 345/426 |
| 2010/0010989 | A1 * | 1/2010 | Li et al. | 707/5 |
| 2010/0142804 | A1 * | 6/2010 | Mallick et al. | 382/162 |
| 2010/0329543 | A1 | 12/2010 | Li et al. | |
| 2011/0069069 | A1 | 3/2011 | Engel | |
| 2012/0263373 | A1 | 10/2012 | Walter et al. | |

(Continued)

OTHER PUBLICATIONS

Keng et al., An Efficient Caching-Based Rendering of Translucent Materials, 2007, The Visual Computer, vol. 23, pp. 59-69.*

(Continued)

*Primary Examiner* — Aaron M Richer
*Assistant Examiner* — Anh-Tuan V Nguyen
(74) *Attorney, Agent, or Firm* — Kilpatrick Townsend & Stockton LLP

(57) ABSTRACT

The present disclosure includes, among other things, systems, methods, and program products for estimating radiant exitance due to subsurface scattering. For example, one or more aspects of the subject matter described in this disclosure can be embodied in one or more methods that include distributing a plurality of sample points across the surface of a 3D object model to be rendered into a 2D image and determining a solid angle subtended by a first sample point and a second sample point relative to a region on the 3D object model. Depending on the determined solid angle relative to a threshold value, a previously determined subsurface scattering contribution for the region or a newly determined subsurface scattering contribution for the region may selectively be used for rendering a portion of the 2D image.

39 Claims, 8 Drawing Sheets

(56) References Cited

U.S. PATENT DOCUMENTS

2013/0120354 A1* 5/2013 Falco et al. ................. 345/419
2014/0204087 A1 7/2014 Habel et al.

OTHER PUBLICATIONS

Jensen, et al. "A Practical Model for Subsurface Light Transport", Proceedings of the 28th annual conference on Computer graphics and interactive techniques (SIGGRAPH '01), Los Angeles, California Aug. 12-17, 2001, 8 pages.
Jensen, et al. "A Rapid Hierarchical Rendering Technique for Translucent Materials", ACM SIGGRAPH 2005 Courses, SIGGRAPH '05, Los Angeles, California, Jul. 31-Aug. 4, 2005, 6 pages.
Pharr, et al. "Physically Based Rendering, from Theory to Implementation", 2nd Edition, (Massachusetts, Elsevier, Inc., Jul. 12, 2010) Cover pages, pp. 679, 688-693 and 885-913.
Wikipedia, "Importance Sampling", downloaded from the internet at: http://en.wikipedia.org/wiki/Importance_sampling, on Jun. 27, 2011 (last revised Apr. 25, 2011), 7 pages.
Baran, I., et al., "A hierarchical volumetric shadow algorithm for single scattering," ACM Transactions on Graphics, 2010, vol. 29, No. 5, pp. 10 pages.
Billeter, M., et al., "Real time volumetric shadows using polygonal light volumes," Proc. High. Performance Graphics, 2010, 7 pages.
Blinn, James F., "Light Reflection Functions for Simulation of Clouds and Dusty Surfaces," Computer Graphics, Jul. 1982, vol. 16, No. 3, 9 pages.
Carr, N.A., et al., "Fast GPU ray tracing of dynamic meshes using geometry images," Graphics Interface, 2006, pp. 203-209.
Chandrasekar, S. 1960. *Radiative Transfer*. Dover Publications.
Chen, J. et al., Real-Time Volumetric Shadows using 1D MinMax Mipmaps, I3D '11 Symposium on Interactive 3D Graphics and Games, (2011), ACM New York, NY, USA, pp. 39-46.
D'Eon, E., and Irving, G. 2011. A quantized-diffusion model for rendering translucent materials. *ACM Transactions on Graphics (Proc. SIGGRAPH)* 30, 4.
D'Eon, E., Luebke, D., and Enderton, E. 2007. Efficient rendering of human skin. In *Rendering Techniques 2007: 18th Eurographics Workshop on Rendering*, 147-158.
Dobashi, Y., et al., "Interactive rendering method for displaying shafts of light," Proc. Pacific Graphics, 2000, IEEE Computer Society, Washington, DC, USA, vol. 31, 8 pages.
Dobashi, Y., et al., "Interactive rendering of atmospheric scattering effects using graphics hardware," Proc. Graphics hardware, 2002, pp. 99-107.
Donner, C., and Jensen, H. W. 2005. Light diffusion in multilayered translucent materials. *ACM Transactions on Graphics (Proc. SIGGRAPH)* 24, 3.
Donner, C., and Jensen, H. W. 2007. Rendering translucent materials using photon diffusion. In *Rendering Techniques 2007: 18th Eurographics Workshop on Rendering*, 243-252.
Engelhardt, T., et al., "Epipolar sampling for shadows and crepuscular rays in participating media with single scattering," Proc. 2010 ACM SIGGRAPH symposium on Interactive 3D Graphics and Gaines, ACM, 2010, pp. 119-125.
Engelhardt, T., Novak, J., and Dachsbachfr, C., "Instant multiple scattering for interactive rendering of heterogeneous participating media." Technical Report. Karlsruhe Institute of Technology, Dec. 8, 2010. 9 pages. Retrieved from http://cg.ibds.kit.edu/downloads/InstantMultipleScattering.sub.-- TechRepo- rtO8Dec2010.pdfonAug. 20, 2013.
Farrell, T., Patterson, M.S., and Wilson, B. 1992. A diffusion theory model of spatially resolved, steady-state diffuse reflectance for the noninvasive determination of tissue optical properties in vivo. *Med. Phys* 19, 4, 879-888.
Guennebaud, Gael, et al., "Real-time soft shadow mapping by backprojection," Eurographics Symposium on Rendering, Toulouse, France, 2006, 8 pages.

Habel, Ralf and Jarosz Wojciech, "Photon Beam Diffusion for Rendering Translucent Materials", PIXAR Internal draft, 6 pages, Jan. 2013.
Habel, Ralf et al., "Photon Beam Diffusion: A Hybrid Monte Carlo Method for Subsurface Scattering", Computer Graphics Forum (Proceedings of the Eurographics Symposium on Rendering 2013), vol. 32. No. 4, 11 pages.
Hachisuka, T., and Jensen, H. W., "Stochastic progressive photon mapping." ACM Transactions on Graphics (TOG), Dec. 2009. 8 pages. Retrieved from http://cs.au.dk/.about.toshiya/sppm.pdf on Aug. 20, 2013.
Hachisuka, T., Ogaki, S., and Jensen, H. W., "Progressive photon mapping." ACM Transactions on Graphics (TOG). val. 27. No. 5. ACM, 2008. 7 pages. Retrieved from http://cs.au.dk/.about.toshiya/ppm.pdf on Aug. 20, 2013.
Havran, V, Bittner, J., Herzog, R., and Seidel, H.-P., "Ray maps for global illumination." Rendering Techniques, 2005. 14 pages. Retrieved from http://www.mpiinf.mpg.de/.about.rherzog/Papers/raymapsEGSR05.pdf on Aug. 20, 2013.
Herzog, R., Havran, V, Kinuwaki, S., Myszkowski, K., and Seidel, H.-P., "Global illumination using photon ray splatting." Computer Graphics Forum val. 26, No. 3, Sep. 2007. (Blackwell Publishing Ltd.), 11 pages. Retrieved from http://www.mpi-inf.mpg.de/.about.rherzog/Pape rs/herzog07EG. pdf on Aug. 20, 2013.
Hu, W., Dong, Z., Ihrke, I., Grosch, T., Yuan, G., and Seidel, H.-P. "Interactive volume caustics in single-scattering media." 13D, *ACM* .2010. 9 pages. Retrieved from http:/ /www.graphics.corneltedu/-zd/down load/13DFinalf[JD20 t 0 Sub .pdf on Aug. 20, 2013.
Imagire, T., et al., "Anti-aliased and real-time rendering of scenes with light scattering effects," The Visual Computer, Sep. 2007, pp. 935-944.
Jarosz, W., Zwicker, M., and Jensen, H. W. "The beam radiance estimate for volumetric photon mapping." *Computer Graphics Forum* vol. 27, No. 2, Apr. 2008. 10 pages. Retrieved from Itttp://znrkh.disneyresearch.com/~wjarosz/publications/jarosz08beam.pdf on Aug. 20, 2013.
Jarosz, W., Nowrouzezahrai, D., Sadeghi, I., and Jensen,H. W. "A comprehensive theory of volumetric radiance estimation using photon points and beams." *ACM Transactions on Graphics*, 2011. 19 pages. Retrieved from http://zurich.disneyresearch.t~om/-wjarosz/publications/jaroszl tconapreb.ensive.pdf on Aug. 20, 2013.
Jarosz, Wojciech, Derek Nowrouzezahrai, Robert Thomas, Peter-Pike Sloan, and Matthias Zwicker, "Progressive Photon Beams", ACM SIGGRAPH Asia 2011, vol. 30, Issue 6, Article No. 181, ACM (Dec. 2011 ), 11 pages.
Jensen, H. W., and Christensen, P. H., "Efficient simulation of light transport in scenes with participating media using photon maps." Proceedings of SIGGRAPH, 1998. 10 pages. Retrieved From http://citeseerx.ist.psu.edu/viewdoc/download?doi=1 0.1.1.118.6575 &rep=rep- 1&type=pdf on Aug. 20, 2013.
Jensen, H. W. 1996. Global illumination using photon maps. In *Proc. of Eurographics Rendering Workshop*,. 17 pages.
Jensen, H. W., and Buhler, J. 2002. A rapid hierarchical rendering technique for translucent materials. *ACM Transactions on Graphics (Proc. SIGGRAPH)* 21, 3.
Jensen, H. W., Marschner, S. R., Levoy, M., and Hanrahan, P. 2001. A practical model for subsurface light transport. In *Proc. of SIGGRAPG '01*. 8 pages.
Kajiya, J. T., "The rendering equation." Computer Graphics, Proceedings of SIGGRAPH 86, 1986. 8 pages. Retrieved from http://x86.cs.du ke.edu/cou rses/cps 124/compsci344/ .. ./16 . . . p143-kajiya.pdf on Aug. 20, 2013.
Kienle, A., and Patterson, M.S. 1997. Improved solutions of the steady-state and the time-resolved diffusion equations for reflectance from a semi-infinite turbid medium. *J. Opt. Soc. Am. A* 14, 1, 246-254.
Knaus, C., and Zwicker, M., "Progressive photon mapping: A probabilistic approach." ACM Transactions on Graphics, 2011. 14 pages. Retrieved from http://www.cs.jhu.edu/.about.misha/ReadingSeminar/Papers/Knaus11.pdf on Aug. 20, 2013.
Kruger, J., Burger, K., and Westermann, R., "Interactive screen-space accurate photon tracing on GPUs." In Rendering Techniques. 2006. 12 pages. Retrieved from http://wwwcg.in.tum.de/research/research/

(56) References Cited

OTHER PUBLICATIONS publications/2006/interactive-sc- reen-space-accurate-photon-tracing-on-gpus.html on Aug. 20, 2013.
Kulla, C., and Fajardo, M. 2012. Importance sampling techniques for path tracing in participating media. *Computer Graphics Forum (Proc. of Eurographics Symposium on Rendering)* 31,4 (June), 1519-1528.
Lafortune, E. P., and Willems, Y. D., "Bi-directional path tracing." Proceedings of Compugraphics, val. 93. 1993. 8 pages.
Lafortune, E. P., and Willems, Y. D., "Rendering participating media with bidirectional path tracing." EG Rendering Workshop. 1996. 11 pages. Retrieved from http://luthuli.cs.uiuc.edu/.about.daf/courses/Rendering/Papers/lafortune9- 6rendering.pdf on Aug. 20, 2013.
Lastra, M., Urena, C., Revelles, J., and Montes, R. "A particle-path based method for Monte-Carlo density estimation. " EG Workshop on Rendering. 2002. 8 pages. Retrieved from http://lsi.ugr.es/.about.curena/inves/egrw02/lastra-egrw02.ps.gz on Aug. 20, 2013.
Liktor, G., and Dachsbacher, C., "Real-time volume caustics with adaptive beam tracing." Symposium on Interactive 3D Graphics and Games. ACM Press. New York, NY. 2011. 8 pages. Retrieved from http://cg.ibds.kit.edu/downloadsNolumeCaustics.sub.--Preprint.pdf on Aug. 20, 2013.
Lokovic, T., and Veach, E. "Deep shadow maps." *SIG-GRAPH*, ACM Press. New York, NY. 2000. 8 pages. Retrieved from http://graphics.stanfontedu/papers/deepshadows/deepshad.pdf on Aug. 20, 2013.
Mastin, G.A., et al., "Fourier synthesis of ocean scenes," IEEE Computer Graphics & Applications, Mar. 1987, pp. 16-23.
Max, N.L., "Atmospheric illumination and shadows," Computer Graphics (Proc. SIGGRAPH '86), ACM, 1986, pp. 117-124.
McGuire, M., and Luebke, D., "Hardware-accelerated global illumination by image space photon mapping." HPG, ACM. 2009. 12 pages. Retrieved from http://graphics.cs.williams.edu/papers/PhotonHPG09/ISPMHPG09.pdf on Aug. 20, 2013.
Musgrave, F.K., et al., "The synthesis and rendering of eroded fracteral terrains," Computer Grapics (Proceedings of SIGGRAPH 89), 1989, pp. 41-50.
Nichols, G., et al., "Multiresolution splatting for indirect illumination," ACM Symposium on Interactive 3D Graphics and Games, ACM, 2009, pp. 83-90.
Novak, J., Nowrouzezahrai, D., Dachsbacher, C., and Jarosz, W. 2012. Virtual ray lights for rendering scenes with participating media. *ACM Transactions on Graphics (Proc. SIGGRAPH)* 31, 4 (July).
Parker, S. G., Bigler, J., Dietrich, A., Friedrich, H., Hoberock, J., Luebke, D., McAllister, D., McGuire, M., Morley, K., Robison, A., and Stich, M., "Optix: A general purpose ray tracing engine." ACM Transactions on Graphics. Jul. 2010, 13 pages. Retrieved from http://graphics.cs.williams.edu/papers/OptiXSIGGRAPH 1 O/Parker1 OOptiX.pdf on Aug. 20, 2013.
Pauly, M., Kollig, T., and Keller, A., "Metropolis light transport for participating media." Rendering Techniques. 2000. 13 pages. Retrieved from http://www.cse.ohiostate.edu/.about.parenUclasses/782/Papers/PhotonMap/metropolis.pdf on Aug. 20, 2013.
Pegoraro, V. et al., "An analytical solution to single scattering in homogeneous participating media," Computer Graphics Forum, 2009, vol. 28, No. 2, 7 pages.
Pegoraro, V. et al., "A closed-form solution to single scattering for general phase functions and light distributions," Computer Graphics Forum, 2010, vol. 29, No. 4, pp. 1365-1374.
Perlin, K., "Noise hardware." Real-time Shading, ACM SIGGRAPH Course Notes. 2001. 26 pages. Retrieved from http://reality.sgiweb.org/olano/s2002c36/ch02.pdf on Aug. 20, 2013.
Raab, M., Seibert, D and Keller, A., "Unbiased global illumination with participating media." Monte Carlo and Quasi-Monte Carlo Methods. 2006. 16 pages. Retrieved from http://www.uni-ulm.de/fileadmin/website.sub.--uni.sub.--ulm/iui.inst.1 00/- institut/Papers/ugiwpm.pdf on Aug. 20, 2013.
Schjoth, L, Frisvad, J. R., Erleben, K., and Sporring,J., "Photon differentials." Graphite, ACM, New York. 2007. 8 pages. Retrieved from http:/ / orbit .dtu. d k/fedo ra/obj ects/orbit: 63065/ datastrea ms/fi le. sub.--550- 4929/content on Aug. 20, 2013.
Sun, B., et al., "A practical analytic single scattering model for real time rendering," ACM Trans. Graph., 2005, vol. 24, No. 3, 10 pages.
Sun, X., Zhou, K., Lin, S., and Guo, B., "Line space gathering for single scattering in large scenes." ACM Transactions on Graphics. 2010. 8 pages. Retrieved from http://www.kunzhou.net/201 0/LSG.pdf on Aug. 20, 2013.
Szirmay-Kalos, L., Toth, B, and Magdics, M., "Free path sampling in high resolution inhomogeneous participating media." Computer Graphics Forum. 2011. 12 pages. Retrieved from http://sirkan.iit.bme. hu/ .about.szirmay/woodcockperlin7 .pdf Aug. 20, 2013.
Tevs, A., et al., "Maximum mipmaps for fast, accurate, and scalable dynamic height field rendering," Symposium on Interactive 3D Graphics and Games (i3D '08), 2008, pp. 183-190.
Veach, E., and Guibas, L. "Bidirectional estimators for light transport." *Fifth Eurographies Workshop on Rendering*. 1994. 20 pages. Retrieved from http:/ /vvwvvO. cs. u cl.ac. uk/research/vr /Pro j ects/VLF/vlfpapers/multipass_hyhrid/V each _E:_mdirectional_ Est.imators_for_Ligh.t_Transportpdf on Aug. 20, 2013.
Veach, E., and Guibas, L. J., "Metropolis light transport." Proceedings of SIGGRAPH 97, Computer Graphics Proceedings, Annual Conference Series. 1997. 12 pages. Retrieved from http://citeseerx.ist.psu.edu/viewdoc/download?doi=1 0.1.1.88.944& rep=rep1&-type on Aug. 20, 2013.
Veach, E., and Guibas, L., "Bidirectional estimators for light transport." Fifth Eurographics Workshop on Rendering. 1994. 20 pages. Retrieved from http://wwwO.cs.ucl.ac.uk/research/vr/Projects/VLF/vlfpapers/multipass. su- b.--hybrid/Veach.sub.--E.sub.--Bi-directional.sub.-- Estimators.sub.--for.s- ub.--Light.sub.--Transport.pdf on Aug. 20, 2013.
Walter, B., Zhao, S., Holzschuch, N., and Bala, K., "Single scattering in refractive media with triangle mesh boundaries." ACM Transactions on Graphics28, 3, 92:1-92:8. Jul. 2009. 7 pages. Retrieved from http://shuangz.com/projects/ambersg09/amber.pdf on Aug. 20, 2013.
Williams, L., "Casting curved shadows on curved surfaces." Computer Graphics, Proceedings of SIGGRAPH 78. 1978. 5 pages. Retrieved from http://www.cs.berkeley.edu/.about.ravir/6160-fall04/papers/p270-williams.-pdf on Aug. 20, 2013.
Wyman, C., et al., "Interactive volumetric shadows in participating media with single-scattering," Proc. IEEE Symposium on Interactive Ray Tracing, 2008, pp. 87-92.
Yue, Y., Iwasaki, K., Chen, B.-Y., Dobashi, Y., and Nishita, T., "Unbiased, adaptive stochastic sampling for rendering inhomogeneous participating media." ACM Transactions on Graphics. 2010. 7 pages. Retrieved from http://nishitalab.org/user/egaku/sigasia 1 0/177. pdf on Aug. 20, 2013.

\* cited by examiner

ACCELERATED SUBSURFACE SCATTERING DETERMINATION FOR RENDERING 3D OBJECTS

TECHNICAL FIELD

This document describes technology for accelerated subsurface scattering calculations, for example, for use in rendering three-dimensional (3D) objects.

BACKGROUND

Rendering realistic 3D images in a computer graphics development environment requires numerous computations and calculations to effectively model real-world lighting conditions and the physical properties of objects to be rendered. For example, an image of a creature in an animated motion picture may involve multiple light sources and the physical properties of the creature may exhibit various qualities such as transparency, reflection, refraction, translucency, and the like.

In general, modeling a highly realistic 3D object involves, among other things, determining both the direct surface scattering and the subsurface scattering contributions for all points on the object, and then combining those direct and subsurface scattering contributions to create a final image of the object. Consequently, modeling the subsurface scattering characteristics of 3D objects, especially those composed of translucent materials, is a crucial component in the look of 3D objects in many computer graphic generated feature films. For example, rendering realistic-looking skin for photo-real digital doubles or other creatures typically involves the use of a rendering technique that captures the subsurface scattering effects of the creatures' skin. In cinematic-quality rendering, one widely-used technique is described in "A Rapid Hierarchical Rendering Technique for Translucent Materials" published in SIGGRAPH 2002 by Henrik Wann Jensen and Juan Buhler.

SUMMARY

This disclosure describes technology, which can be implemented as a method, apparatus, and/or computer software embodied in a computer-readable medium, to help perform accelerated subsurface scattering calculations, for example, for use in rendering highly realistic, cinematic quality three-dimensional (3D) objects.

In general, in one aspect, a method performed by one or more processes executing on a computer system includes distributing a plurality of sample points across the surface of a 3D object model to be rendered into a 2D image, determining a solid angle subtended by a first sample point and a second sample point relative to a region on the 3D object model, and depending on the determined solid angle relative to a threshold value, selectively using for rendering a portion of the 2D image either a previously determined subsurface scattering contribution for the region or a newly determined subsurface scattering contribution for the region. Other implementations of this aspect include corresponding systems, apparatus, and computer program products.

This, and other aspects, can include one or more of the following features. When selectively used for rendering the portion of the 2D image, at least one of the previously determined subsurface scattering contribution and the newly determined subsurface scattering contribution can be used to partially determine the total radiant exitance due to subsurface scattering of a scattering point. If the solid angle is less than the threshold value, the method can further selectively use the previously determined subsurface scattering contribution for rendering the portion of the 2D image. Likewise, if the solid angle is greater than or equal to the threshold value, the method can selectively use the newly determined subsurface scattering contribution for rendering the portion of the 2D image. The method can further include applying a luminosity function to an incident irradiance associated with the region. The method can further include constructing an octree data structure over a subset of the plurality of sample points associated with the 3D object model, where the octree may include a plurality of nodes, each node in the octree may include data associated with at least one sample point in the subset, and a node in the octree may represent the region on the 3D object model. The previously determined subsurface scattering contribution for the region may partially be determined by using a position in 3D space for the first sample point and the node representing the region may include the previously determined subsurface scattering contribution for the region and the position in 3D space for the first sample point. The method may further include replacing the previously determined subsurface scattering contribution included in the node representing the region with the newly determined subsurface scattering contribution, where the newly determined subsurface scattering contribution for the region may partially be determined by using a position in 3D space for the second sample point, and where the position in 3D space for the first sample point included in the node representing the region may be replaced with the position in 3D space for the second sample point. The subset of the plurality of sample points may be a pre-pass subset of the plurality of sample points and the first sample point and second sample point may be part of a final-pass subset of the plurality of sample points. The method may further include allocating memory to store the octree data structure in the memory as a flattened octree data structure, where the flattened octree data structure organizes child nodes close to their parents within a single contiguous memory block. The method may further include rendering the 3D object model into a pair of complimentary 2D stereoscopic images.

In another aspect, a method performed by one or more processes executing on a computer system includes distributing a plurality of sample points across the surface of a 3D object model to be rendered into a 2D image, constructing a hierarchical octree data structure over a first subset of the plurality of sample points, the octree data structure comprising a plurality of nodes where each node in the octree is associated with at least one of the sample points in the first subset and a node in the octree represents a region on the 3D object, where the node representing the region includes a previously determined subsurface scattering contribution and a position of a first sample point used in the determination of the previously determined subsurface scattering contribution, the first sample point being from a second subset of the plurality of sample points, determining a solid angle subtended by the first sample point and a second sample point, selected from the second subset, relative to the region on the 3D object, and depending on the determined angle relative to a threshold value, selectively using for rendering a portion of the 2D image either the previously determined subsurface scattering contribution or a newly determined subsurface scattering contribution.

This, and other aspects, can include one or more of the following features. When selectively used for rendering the portion of the 2D image, at least one of the previously determined subsurface scattering contribution and the newly determined subsurface scattering contribution can be used to partially determine the total radiant exitance due to subsurface scattering of a scattering point. The first subset of the plurality of sample points may be a set of pre-pass sample points and the second subset of the plurality of sample points may be a set of final-pass sample points. The method may further include, if the solid angle is greater than or equal to the threshold value, determining the newly determined subsurface scattering contribution using the second sample point, selectively using the newly determined subsurface scattering contributing for rendering the portion of the 2D image, and replacing, in the node representing the region, the previously determined subsurface scattering contribution with the newly determined subsurface scattering contribution and the position of the first sample point with a position of the second sample point. If the solid angle is less than the threshold value, the method may further include selectively using the previously determined subsurface scattering contribution for rendering the portion of the 2D scene. The method may further include determining the threshold value in part by applying a luminosity function to an incident irradiance associated with the region. The method may further include allocating memory to store the octree data structure in the memory as a flattened octree data structure, where the flattened octree data structure organizes child nodes close to their parents within a single contiguous memory block.

In another aspect, a method performed by one or more processes executing on a computer system includes distributing a plurality of sample points across the surface of a 3D object model to be rendered into a 2D image, determining a distance between a first sample point and a second sample point relative to a region on the 3D object model, and depending on the determined distance relative to a threshold value, selectively using for rendering a portion of the 2D image either a previously determined subsurface scattering contribution for the region or a newly determined subsurface scattering contribution for the region.

Potential advantages described in this disclosure may include improved computational performance for rendering 3D images. For example, computational overhead may be reduced while providing enhanced quality of images in animated feature films. Both the time to compute subsurface scattering contributions and the overall time required to render a 3D image may be reduced thus freeing computational resources and allowing for more image rendering.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

The following disclosure, in conjunction with the figures, describes technology for determining, in an accelerated and efficient manner, subsurface scattering characteristics of points on a 3D object defined by a model.

Figure 1:
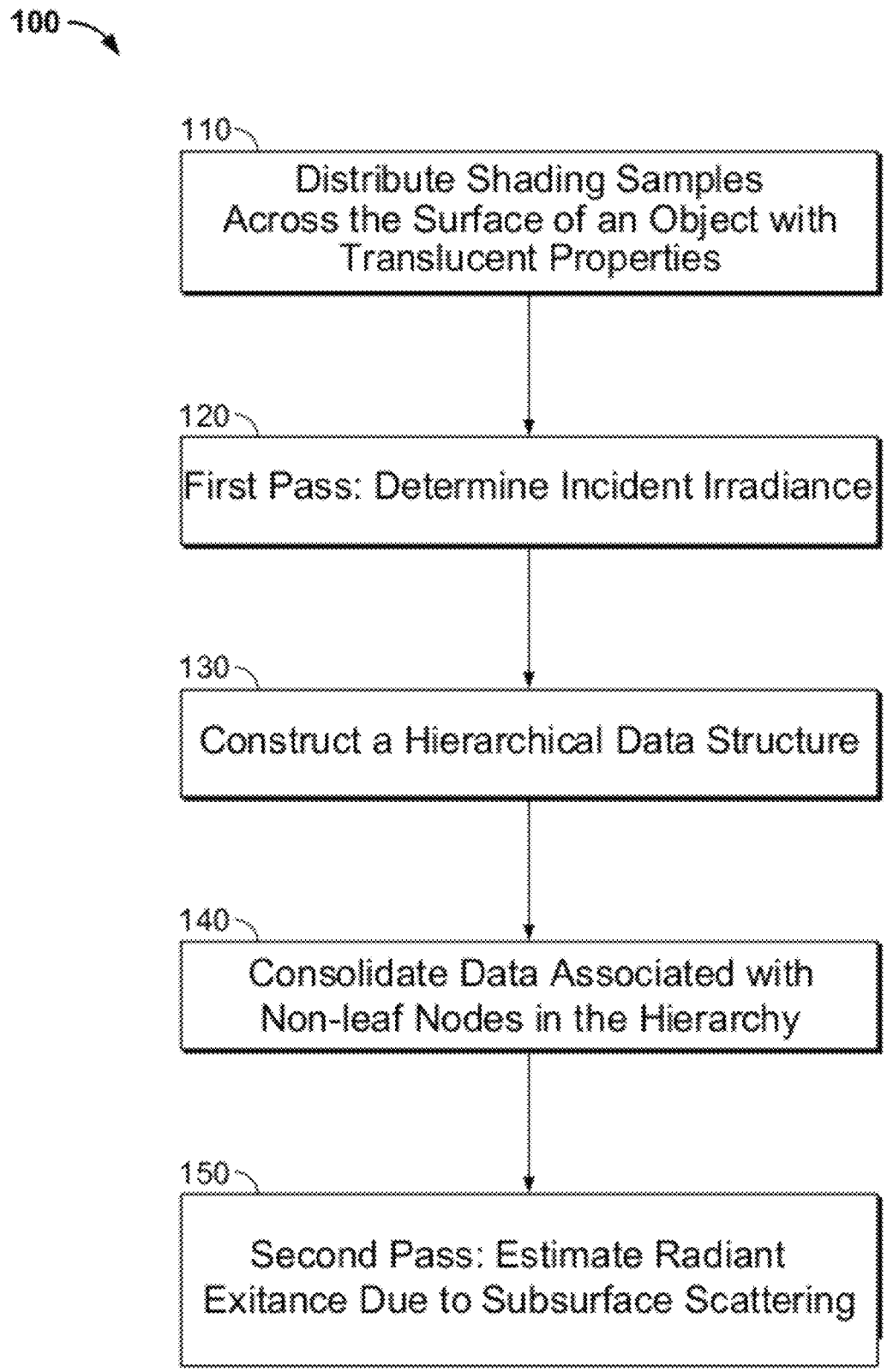
FIG. 1 is a flowchart of a two-pass method for estimating the radiant exitance due to subsurface scattering for a translucent object.

FIG. 1 is a flowchart of a two-pass method for estimating the radiant exitance due to subsurface scattering for an object with translucent properties. For example, the object may be a 3D object model being rendered into a 2D image, or a pair of complimentary 2D stereoscopic images. In some implementations, the two pass method in FIG. 1 can be performed under the control of a processor or control logic in the computer system 800 during a rendering phase of a computer-generated image.

In step 110 shading samples can be distributed across the surface of an object with translucent properties in an image to be rendered. In some implementations, the shading samples are sample points in 3D space on the surface of the translucent object. Various techniques can be used to distribute shading samples across the surface of a translucent object. For example, shading samples may be distributed uniformly, randomly, based on a particular weight associated with regions of the object, or any other suitable distribution technique. Regardless of which distribution technique is chosen, it is generally important to include enough shading samples to account for factors such as the geometry of the object, the variation of lighting in the image, the subsurface scattering properties of the object, and the integration technique being used to compute subsurface scattering properties. In some implementations, the shading samples are distributed relatively uniformly across the surface of an object such that the incident irradiance is sampled at a regular rate.

In step 120, a first pass is made over a subset of the shading samples distributed across the surface of the translucent object in step 110. For clarity in this disclosure, the shading samples used in the first pass at steps 120, 130, and 140 can be termed "pre-pass shading samples," as distinguished from "final-pass shading samples" that will be referred to below in reference to a second pass over shading samples distributed in step 110. In some implementations, only a subset of the shading samples distributed across the object in step 110 may be used in the first pass at steps 120, 130, and 140. Similarly, only a subset of the shading samples distributed across the object in step 110 may be utilized in the second pass at step 150.

In the first pass at step 120, the incident irradiance at each of the pre-pass shading samples can be determined. Such incidence irradiance may be associated with the incoming light at the pre-pass shading samples. In some implementations, data associated with the pre-pass shading samples may be stored in memory for further processing. For example, the set of pre-pass shading samples along with the position of each pre-pass shading sample, area of each pre-pass shading sample, and determined incident irradiance associated with each pre-pass shading sample can be stored in memory 820 for subsequent use.

In step 130, a hierarchical data structure can be created representing the pre-pass shading samples used in step 120. A number of different hierarchical structures can be used including, for example, a kd-tree. In some implementations, a hierarchical octree data structure is used to represent the hierarchy over the pre-pass shading samples. In an octree data structure, there can be a root node at the top of the hierarchy and each node in the hierarchy can store up to eight immediate child nodes. The leaves at the bottom of the hierarchical octree data structure can be directly associated with individual pre-pass shading samples. In some implementations, each leaf node is associated with a single pre-pass shading sample. The position, area, and incident irradiance determined in step 120 can be stored with corresponding leaf nodes in the hierarchical data structure created in step 130.

For example, each node in the hierarchical data structure constructed at step 120 represents either an individual pre-pass shading sample, at the leaf nodes, or else a cluster of pre-pass shading samples, at the non-leaf nodes. A non-leaf node in the hierarchical data structure may represent a cluster of pre-pass shading samples, each pre-pass shading sample in the cluster having a different position, area, and incidence irradiance. It may therefore be beneficial to consolidate the data associated with each non-leaf node in the hierarchical data structure.

For example, in step 140 the position data associated with a non-leaf node can be consolidated to a position that is the centroid, or average, position over all the node's children within the hierarchy, such that a non-leaf node approximates the positions associated with its child nodes. In step 140, the area data associated with a non-leaf node can be consolidated by summing the area over all the node's children within the hierarchy. Further, in step 140, the incident irradiance associated with a non-leaf node can also be consolidated by summing the incident irradiance over all the node's children within the hierarchy. Additionally, in step 140, a bounding box for a non-leaf node can be determined from the minimum and maximum positions (e.g., x, y, z) of the node's children. Data consolidated in step 140 can then be stored with the respective non-leaf nodes in the hierarchical data structure. It should be appreciated that constructing step 130 and consolidating step 140 can be combined such that data is consolidated as the hierarchical data structure is constructed in step 130.

In step 150, a second pass is made over a subset of the shading samples distributed across the surface of the translucent object in step 110. For clarity, the set of shading samples distributed across the surface of the translucent object in step 110 that are used in step 150 are referred to as "final-pass shading samples" in the second pass. In step 150, for each final-pass shading sample, the radiant exitance due to subsurface scattering for that shading sample is estimated. One example strategy for estimating subsurface scattering is to use an approximation such as the dipole diffusion approximation. In some implementations, given a particular final-pass shading sample and any one nearby pre-pass shading sample on the surface of a translucent object, the dipole diffusion approximation can be used to estimate how much light is scattered through the surface from the pre-pass shading sample onto the final-pass shading sample. That is, the dipole diffusion approximation is used to approximate the subsurface scattering contributions from the pre-pass shading samples. These contributions can then be used in the estimation of the total radiant exitance due to subsurface scattering for a final-pass shading sample.

An example algorithm to compute the total radiant exitance due to subsurface scattering at a final-pass shading sample would be to apply the dipole diffusion approximation to sum up the subsurface scattering contributions over all the pre-pass shading samples. That is, apply the dipole diffusion approximation to each pre-pass shading sample, thus estimating the subsurface scattering contribution for each pre-pass shading sample onto a final-pass shading sample, and then sum up the results to estimate the total radiant exitance due to subsurface scattering for the final-pass shading sample.

Another approach might be to still use the dipole diffusion approximation, but rather than applying it to each individual pre-pass shading sample, e.g., leaf node in the hierarchical data structure, to instead use a heuristic to determine when to approximate a distant cluster of pre-pass shading samples, e.g., non-leaf node in the hierarchical data structure, by treating the cluster as a single entity, and applying the dipole diffusion approximation to the cluster. In some implementations, the centroid position of a non-leaf node, along with the summed area and the summed incident irradiance over the non-leaf node's children, would be used as input values to the dipole diffusion approximation in order to estimate the subsurface scattering contribution from that non-leaf cluster node of pre-pass shading samples onto a final-pass shading sample. This approach is described in more detail in "A Rapid Hierarchical Rendering Technique for Translucent Materials" published in SIGGRAPH 2002 by Henrik Wann Jensen and Juan Buhler.

Figure 2:
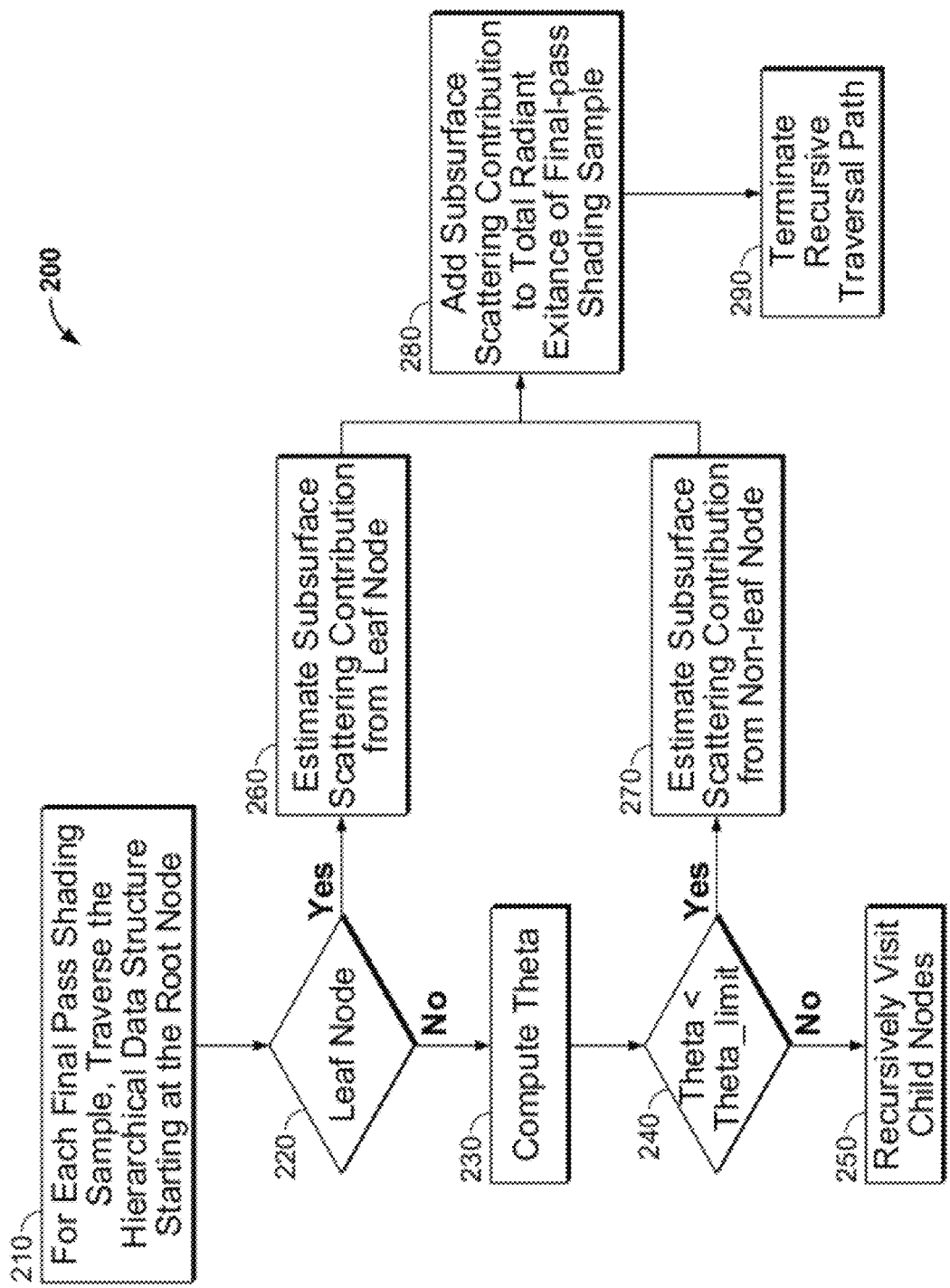
FIG. 2 is a flowchart of a method for estimating the subsurface scattering contributions in the second pass of the method illustrated in FIG. 1.

FIG. 2 is a flowchart of a method for estimating the subsurface scattering contributions in step 150 of the flowchart illustrated in FIG. 1. In some implementations, the flowchart 200 in FIG. 2 estimates the total radiant exitance due to subsurface scattering for each final-pass shading sample by estimating the subsurface scattering contributions from pre-pass shading samples onto each final-pass shading sample.

In step 210, for each final-pass shading sample, the hierarchical data structure constructed in step 130 of FIG. 1 may be recursively traversed, starting at the root node. In step 220, if during traversal of the hierarchical data structure a leaf node is reached, then the estimated subsurface scattering contribution from the leaf node onto the final-pass shading sample currently under evaluation can be computed at step 260 directly from the data associated with the leaf node itself, e.g., the incident irradiance, area, and position of a pre-pass shading sample. In some implementations, the dipole diffusion approximation is applied to the leaf node at step 260, using the position, area, and incident irradiance associated with the leaf node as inputs into the dipole diffusion approximation. In step 280, the subsurface scattering contribution estimated in step 260 can be added to the total radiant exitance due to subsurface scattering of the final-pass shading sample currently under evaluation. The current recursive traversal path can then be terminated at step 290.

If at step 220 the current traversal of the hierarchical data structure is not at a leaf node, then the solid angle "theta" that the current non-leaf node subtends can be determined at step 230. In some implementations, the solid angle is determined by subtending a bounding box associated with the non-leaf node, where the viewpoint that the solid angle is measured with respect to is the position of the final-pass shading sample currently under evaluation. The position of the final-pass shading sample may correspond to a position in 3D space. In some implementations, using the area and position of the non-leaf node, the solid angle can be the angle subtended from one edge of the node to the other edge of the node, where the viewpoint that the solid angle is measured with respect to is still the position of the final pass shading sample currently under evaluation.

In step 240, if the solid angle theta is below a specified limit, "theta_limit", then the estimated subsurface scattering contribution from the non-leaf node onto the final-pass shading sample currently under evaluation can be computed at step 270 from the data associated with the non-leaf node, e.g., a cluster of pre-pass shading samples. In some implementations, the dipole diffusion approximation can be applied to the non-leaf node at step 270, using the centroid position, the summed area, and the summed incident irradiance associated with the non-leaf node as input values to the dipole diffusion approximation. In step 280, the subsurface scattering contribution estimated in step 270 can be added to the total radiant exitance due to subsurface scattering of the final-pass shading sample currently under evaluation. The current recursive traversal path can then be terminated at step 290.

On the other hand, if at step 240 the solid angle theta is equal to or above the specified theta_limit, traversal continues to the non-leaf node's children.

In each recursive traversal of the hierarchical data structure starting at the root node, the subsurface scattering contributions from the various nodes encountered during traversal can be summed to estimate the total radiant exitance due to subsurface scattering for a final-pass shading sample.

Figure 3:
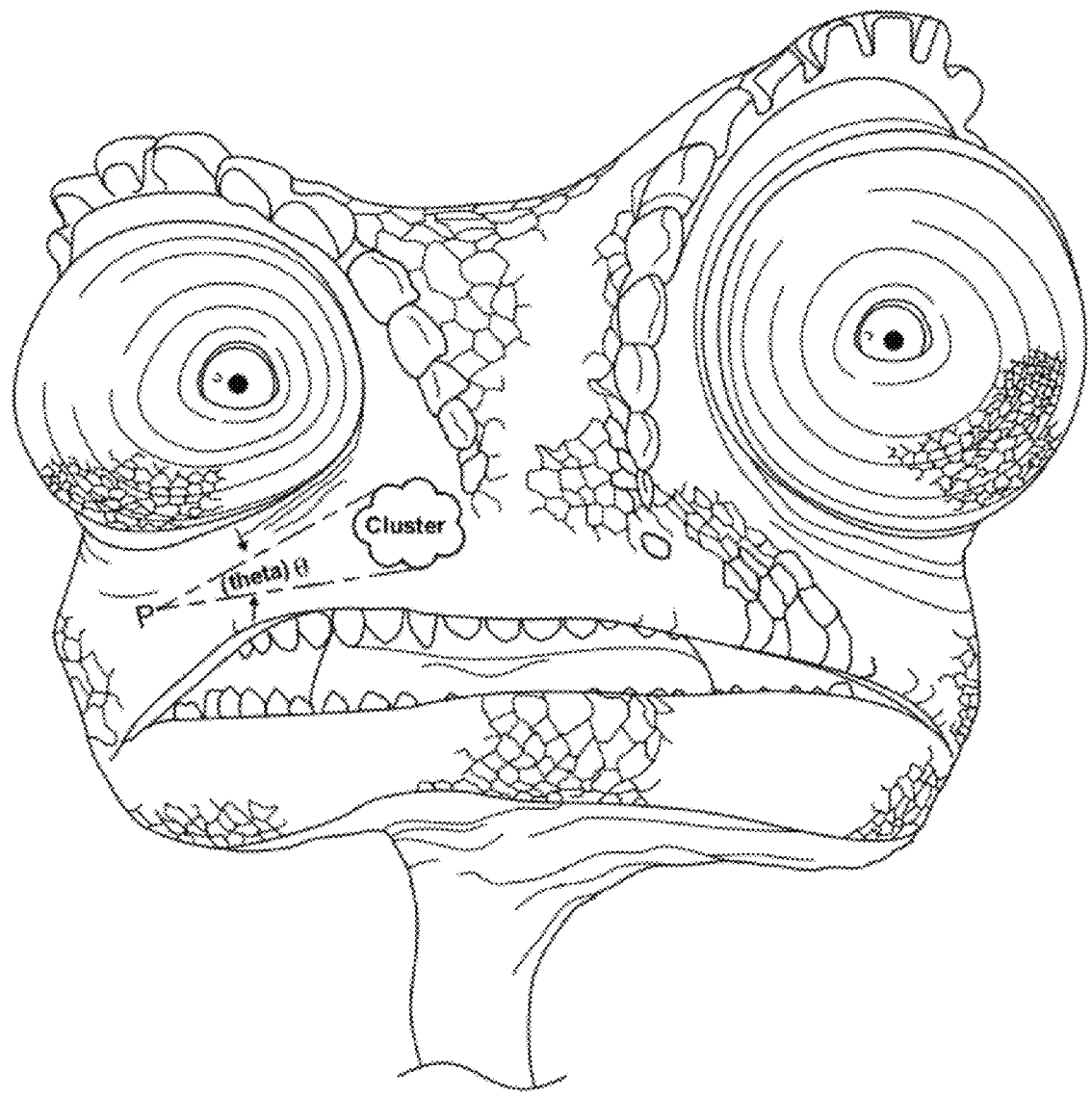
FIG. 3 is a diagram showing a solid angle subtended by a node where the viewpoint that the solid angle is measured with respect to is a position of a final-pass shading sample.

FIG. 3 is a diagram showing a solid angle subtended by a node where the viewpoint that the solid angle is measured with respect to is a position of a final-pass shading sample. In FIG. 3, P is a final-pass shading sample for which the radiant exitance due to subsurface scattering is currently under evaluation at step 210. "Cluster" is a node in the hierarchical data structure created in step 130. In some implementations, Cluster can be a non-leaf node. Let the current traversal of the hierarchical data structure at step 210 be at the node, Cluster. Let theta be the solid angle subtended by the bounding box of Cluster computed at step 230, where the viewpoint that the solid angle is measured with respect to is the position of the final-pass shading sample P. For example a position in 3D space. If theta is less than a specified theta_limit, then the subsurface scattering contribution from Cluster onto P can be determined, for example by applying the dipole diffusion approximation to Cluster at step 270. If theta is not less than the specified theta_limit at step 240, then traversal will continue to Cluster's child nodes at step 250.

Figure 4:
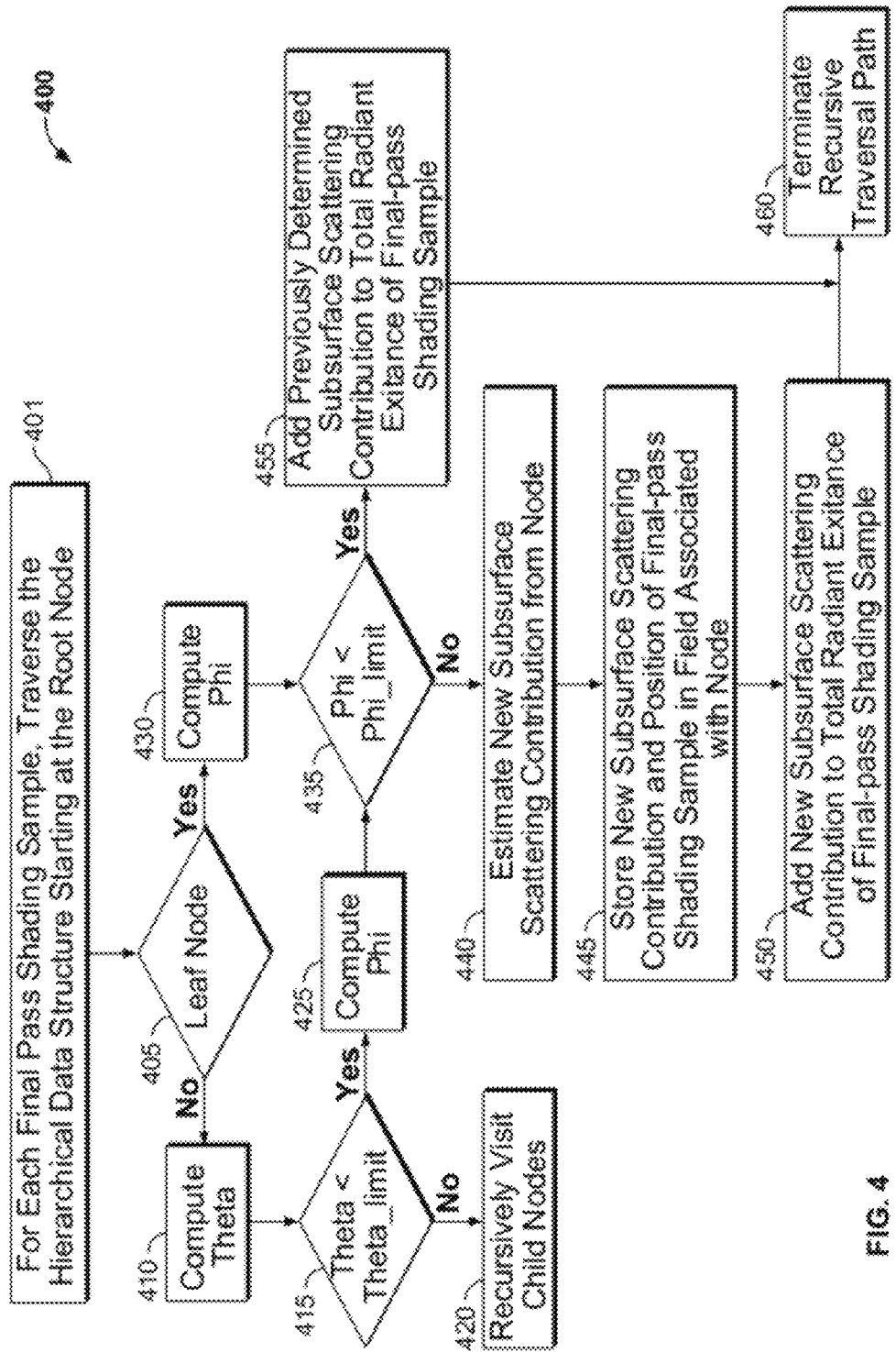
FIG. 4 is a flowchart of a method for estimating radiant exitance due to subsurface scattering by re-using previously calculated subsurface scattering contributions.

FIG. 4 is a flowchart of a method for estimating radiant exitance due to subsurface scattering by re-using previously calculated subsurface scattering contributions. In some implementations, the method 400 estimates the total radiant exitance due to subsurface scattering for each final-pass shading sample distributed across the surface of an object having translucent properties. FIG. 4 utilizes a hierarchical caching scheme that re-uses previously calculated subsurface scattering contributions among final-pass shading samples. The hierarchical caching scheme in FIG. 4 extends the method in FIG. 2 by storing previously calculated subsurface scattering contributions with nodes in the hierarchical data structure, as an additional field of the contributing nodes. These subsurface scattering contributions can then potentially be re-used for nearby final-pass shading samples when subsequent traversals of the hierarchical data structure revisit the same nodes. The potential for error can be bound by caching, with each node in the hierarchical data structure, a previously computed subsurface scattering contribution and the position of the final-pass shading sample associated with the previously computed subsurface scattering contribution. For re-use, the position of the final-pass shading sample associated with the previously computed subsurface scattering contribution should subtend a solid angle no greater than some limit to the position of a new final pass-shading sample currently under evaluation, where the viewpoint that the solid angle is measured with respect to is a position associated with the contributing node. In some implementations, only one subsurface scattering contribution is stored for each node. Thus, in the event of a cache miss, e.g., the solid angle is greater than a specified limit, the subsurface scattering contribution and the position of the final-pass shading sample used to compute the subsurface scattering contribution are replaced in the hierarchical data structure.

Referring now to FIG. 4, in step 401, for each final-pass shading sample, the hierarchical data structure constructed in step 130 of FIG. 1 is recursively traversed, starting at the root node. In step 405, if during traversal of the hierarchical data structure a leaf node is reached then at step 430 the solid angle "phi" can be determined. In some implementations, phi is a solid angle subtended by the position of the final-pass shading sample currently under evaluation and the position of the final-pass shading sample associated with a previously calculated subsurface scattering contribution stored with the leaf node, where the viewpoint that the solid angle phi is measured with respect to is a position associated with the leaf node. If at step 435 phi is less than a specified phi_limit, then at step 455 the previously determined subsurface scattering contribution associated with the leaf node can be added to the total radiant exitance of the final-pass shading sample currently under evaluation. The current recursive traversal path can then be terminated at step 460.

If, in step 435 phi is greater than or equal to phi_limit, a new subsurface scattering contribution can be estimated for the leaf node at step 440. In some implementations, a dipole diffusion approximation is applied to the leaf node at step 440, using a position, area, and incident irradiance associated with the leaf node as inputs into the dipole diffusion approximation. At step 445, the newly calculated subsurface scattering contribution along with the position of the final-pass shading sample currently under evaluation can be stored in the hierarchical data structure in a field associated with the leaf node. In step 450, the newly estimated subsurface scattering contribution from step 440 can be added to the total radiant exitance of the final-pass shading sample currently under evaluation. The current recursive traversal path can then be terminated at step 460.

If at step 405 current traversal of the hierarchical data structure is not a leaf node, then the solid angle "theta" that the current non-leaf node subtends can be determined at step 410. In some implementations, theta is determined by subtending a bounding box associated with the non-leaf node, where the viewpoint that the solid angle theta is measured with respect to is the position of the final-pass shading sample currently under evaluation. In other implementations, using the area and position of the non-leaf node, the solid angle can be the angle subtended from one edge of the node to the other edge of the node, where the viewpoint that the solid angle is measured with respect to is still the position of the final pass shading sample currently under evaluation.

In step 415, if the solid angle theta is below a specified limit, theta_limit, then at step 425 the solid angle, phi, can be determined. In some implementations, phi is the solid angle subtended by the position of the final-pass shading sample currently under evaluation and the position of the final-pass shading sample associated with a previously calculated subsurface scattering contribution stored with the non-leaf node, where the viewpoint that the solid angle phi is measured with respect to is a position associated with the non-leaf node. If at step 435 phi is less than a specified phi_limit, then at step 455 a previously determined subsurface scattering contribution associated with the non-leaf node can be added to the total radiant exitance of the final-pass shading sample currently under evaluation. The current recursive traversal path can then be terminated at step 460.

If, in step 435, phi is greater than or equal to phi_limit, then a new estimated subsurface scattering contribution from the non-leaf node onto the final-pass shading sample currently under evaluation can be computed at step 440. In some implementations, a dipole diffusion approximation is applied to the non-leaf node at step 440, using a centroid position, a summed area, and a summed incident irradiance associated with the non-leaf node as input values to the dipole diffusion approximation. At step 445, the newly calculated subsurface scattering contribution along with the position of the final-pass shading sample currently under evaluation can be stored in the hierarchical data structure in a field associated with the non-leaf node. In step 450, the newly estimated subsurface scattering contribution from step 440 can be added to the total radiant exitance due to subsurface scattering of the final-pass shading sample currently under evaluation. The current recursive traversal path can then be terminated at step 460.

On the other hand, if at step 415 the solid angle theta is equal to or above the specified theta_limit, traversal continues to the non-leaf node's children at step 420.

Phi_limit can be specified in any numbers of ways. For example, phi_limit may be a user specified value input through computer system 800. Phi_limit may be numerically generated based on data within the hierarchical data structure created at step 130 or any data suitable for governing the use of previously calculated subsurface scattering contributions.

Figure 5:
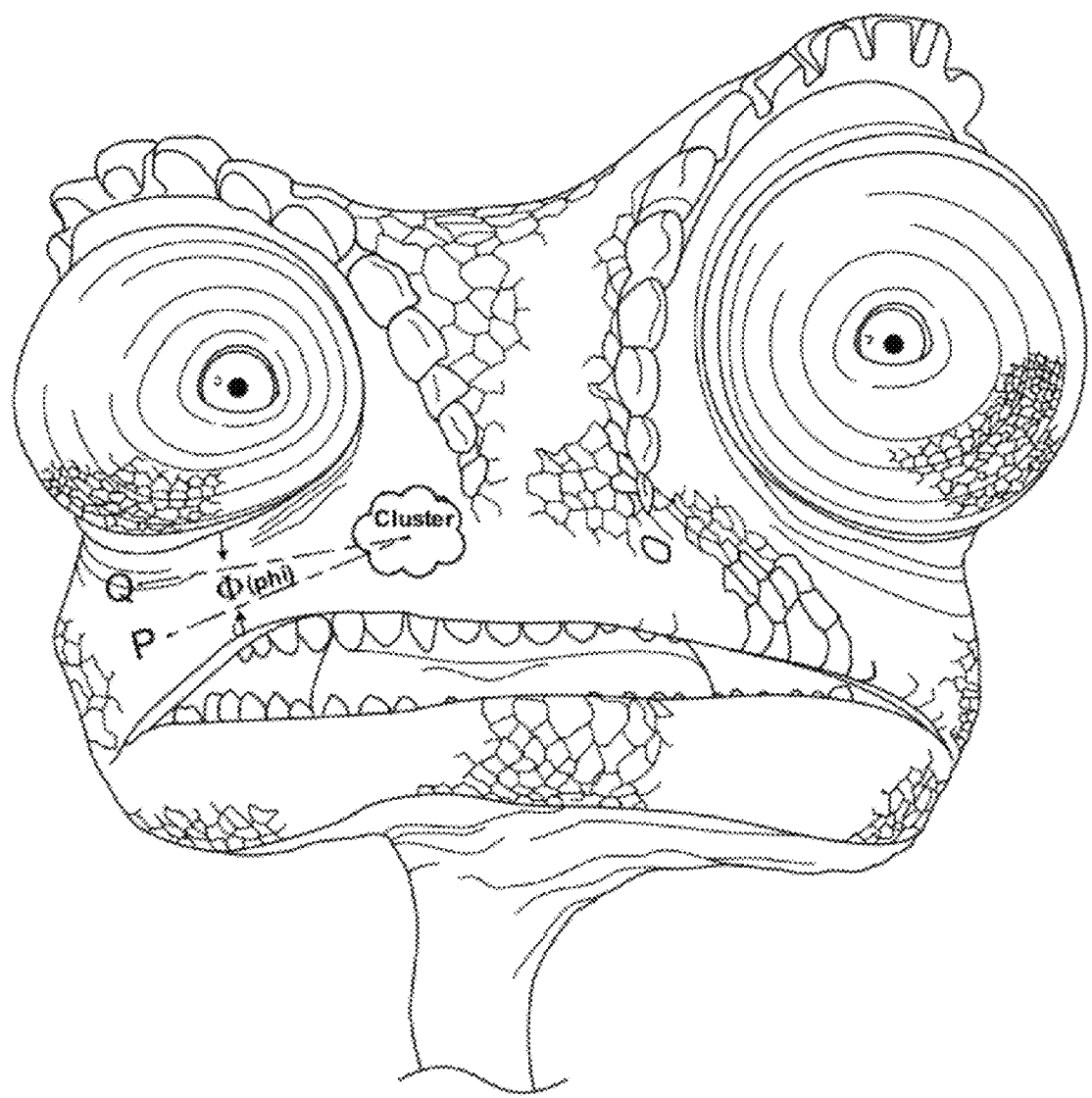
FIG. 5 is a diagram showing a solid angle subtended from one final-pass shading sample to another final-pass shading sample, where the viewpoint that the solid angle is measured with respect to is a position associated with a node in a hierarchical data structure.

FIG. 5 is a diagram showing a solid angle subtended from one shading sample to another shading sample, as viewed from a node in a hierarchical data structure. In some implementations, the solid angle phi may subtend a position in 3D space of one shading sample to another position in 3D space of another shading sample, as viewed from a node, e.g., the centroid of a node, in a hierarchical data structure. For example, the solid angle phi computed in step 425 or 430. Referring to FIG. 5, P may be a final-pass shading sample for which the radiant exitance due to subsurface scattering has already been estimated. For example, the radiant exitance due to subsurface scattering for P may have been computed in accordance with the methods in FIG. 2 or FIG. 4. Q may be a final-pass shading sample for which the radiant exitance due to subsurface scattering is currently under evaluation in FIG. 4. Let Cluster be a node in the hierarchical data structure created at step 130 for which the subsurface scattering contribution onto Q is currently under evaluation in method 400. In step 425 or 430, the angle phi can then be computed as the angle subtended from P to Q, as measured in relation to Cluster. For example, the viewpoint that the solid angle phi is measured with respect to can be the centroid position associated with Cluster. For simplicity, this can also be referred to as measuring the solid angle phi from Cluster or viewing the solid angle phi from Cluster.

When re-using subsurface scattering contributions amongst final-pass shading samples, it may be beneficial to tune how aggressively previously determined subsurface scattering contributions are re-used. Such tuning can be done with a strategy analogous to importance sampling to effectively focus on areas of a translucent object that have more significance. In some implementations, the significance of a node in the hierarchical data structure created in step 130 can be based on the size, e.g., area, and/or incident irradiance associated with that node. Thus, in regions that are deemed to be more significant, phi_limit can be set lower such that fewer previously determined subsurface scattering contributions are re-used. Similarly, in areas that are deemed less important, phi_limit can be set higher such that a greater number of previously determined subsurface scattering contributions are re-used.

A significance value can be associated with each node in the hierarchical data structure either when the hierarchical data structure is constructed at step 130 or when data is consolidated at step 140. Alternatively, a significance value may be computed on the fly while evaluating phi, for example in step 435 of FIG. 4.

Figure 6:
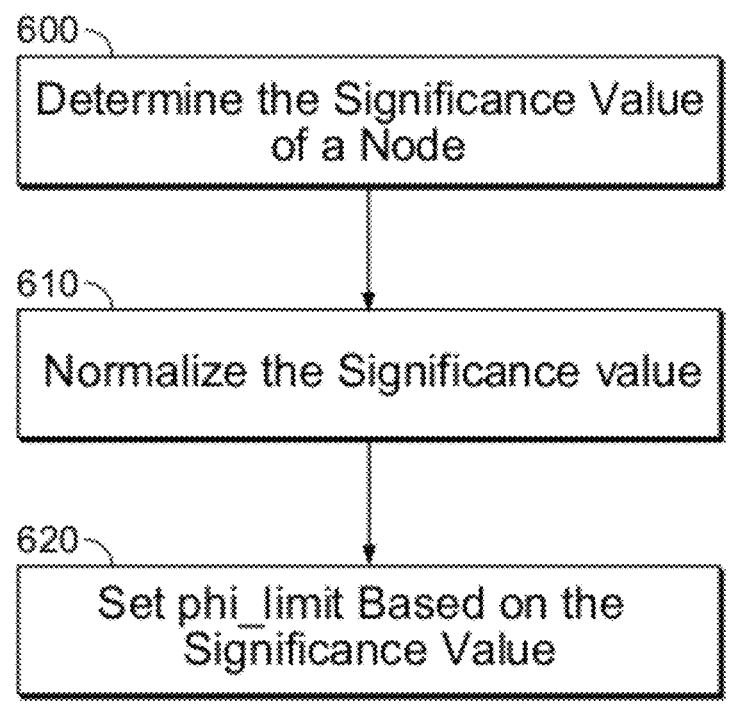
FIG. 6 is a flowchart of a method for significance sampling.

Referring to FIG. 6, a significance value can be determined at step 600. For example, if a node in a hierarchical data structure is a leaf node, the significance value can be based on the incident irradiance of the leaf node and/or the area of the leaf node. Similarly, if the node is a non-leaf node, the significance value can be determined based on the summed incident irradiance of the non-leaf node and/or the area associated with the non-leaf node. In some implementations, the significance value of a node is computed by applying a luminosity function to the incident irradiance associated with the node times the area associated with the node.

The significance value determined in step 600 can be normalized in step 610. In some implementations, the normalization step 610 normalizes the significance values such that the significance values fall between zero and one inclusive. The value, phi_limit, as discussed above, may then be calculated at step 620 based on the significance value. In some implementations, phi_limit can be calculated on the fly per node. In other implementations, phi_limit can be calculated at steps 130 or 140 prior to the second pass 150 and stored within a field associated with a corresponding node. In still other implementations, phi_limit may be determined by performing a linear interpolation between a specified phi_max and phi_min. Phi max and phi_min may be, for example, values that are provided by a user through a user interface associated with input/output device 840 in FIG. 8. In some implementations, phi_max and phi_min can be values that have been empirically found to provide results nearly visually indistinguishable from those achieved without the optimization being applied and to provide those results faster than without the optimization being applied. For example, a perceptual metric and/or a subjective visual examination can be applied to determine whether the results are nearly visually indistinguishable.

It will be appreciated that theta_limit used in steps 240 and 415 may be set similarly to that of phi_limit. For example, theta_limit may be set based on a significance associated with a node and tuned in a similar fashion to that described above with regard to phi_limit.

The hierarchical data structure constructed in step 130 can take the form of any suitable representation of a subset of the shading samples distributed across the surface of a translucent object in step 110. In some implementations, the hierarchical data structure representing the shading samples can be an octree data structure. The hierarchical octree data structure effectively encodes a hierarchical clustering of the shading samples distributed in step 110.

A significant implementation choice is how an octree data structure is organized in memory. In some implementations, the choice would be to use the system call "malloc( )", that is, the system memory allocator, to allocate the memory for each node and child node in the octree hierarchy. During traversal of such an octree, for example in the second pass at step 150, this choice may result in needing to load distant memory locations as the various octree nodes are visited during traversal, thus partially voiding the advantages of system L1 and L2 memory caches associated with a processor. Whether this will be an issue may depend on the details of how the memory allocator is implemented. In some implementations, it has been found that there is a significant performance benefit to organizing the memory layout of octree nodes such that an octree is: (a) allocated as a single contiguous block of memory, and (b) such that child nodes tend to be located relatively close by to their parent nodes. By doing this, cache coherency tends to be maximized while improving overall system performance.

Use of a flattened octree data structure has several advantages over a regular, non-flattened octree data structure. In VFX and animated features applications, 64-bit operating systems and hardware are commonly used. This has the result that pointers are 8-bytes, instead of 4-bytes, as they would be on a 32-bit operating system. A first advantage is that by using a 4-byte integer to reference the offset of a sub-node within a larger memory chunk, instead of using an 8-byte pointer to reference the memory location of the sub-node directly, less memory can be used to store the flattened octree. The use of less memory can be important in order to allow rendering of more complex scenes and better utilization of computational resources as potentially more processes can be run concurrently on the same machine, making use of more available processors on the machine, without running out of memory.

A second advantage is that using a 4-byte integer to reference the sub-nodes instead of using an 8-byte pointer to reference the sub-nodes has an additional time performance advantage in that, because each node uses less memory, there is an increased likelihood that octree nodes that are visited during traversal will be found in the L1, L2, or L3 cache of the CPU.

A third advantage is that by organizing the child nodes of the octree close to their parent nodes within a single contiguous block, there is an increased likelihood that the octree nodes that are visited during parent-to-child traversal will be found in the L1, L2, or L3 cache of the CPU.

Figure 7:
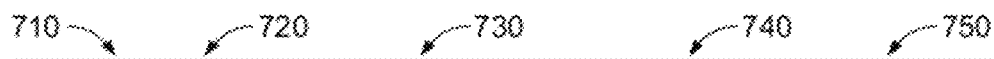
FIG. 7 shows an example comparison between the computation of radiant exitance due to subsurface scattering with and without re-use of subsurface scattering contributions.

FIG. 7 is an illustrative comparison between the computation of radiant exitance due subsurface scattering with and without re-use of subsurface scattering contributions. For example, FIG. 7 provides a comparison between the computation of radiant exitance due to subsurface scattering in FIG. 2 without re-use of subsurface scattering contributions and FIG. 4 with re-use of subsurface scattering contributions. Column 710 labeled "shot" corresponds to point rendered images. Column 720 labeled "scatter times old" corresponds to the time, in seconds, taken to compute the radiant exitance due to subsurface scattering without the re-use of subsurface scattering contributions. Column 730 labeled "scatter times new" represents the times in seconds that are required to compute the radiant exitance due to subsurface scattering by re-using subsurface scattering contributions. Between a 4.6× and 8× performance improvement is observed when re-using previously calculated subsurface scattering contributions in the computation of radiant exitance due to subsurface scattering.

The time required to estimate the radiant exitance due to subsurface scattering is just a part of the total rendering time for an image. For some perspective, columns 740 and 750 labeled "beauty times" are shown. The times shown in columns 740 and 750 include the time required to compute radiant exitance due to subsurface scattering as well as other calculations that happen in a beauty pass, or final rendering pass, that are used to render an image. Column 740 lists the time in seconds for a beauty pass of an image in column 710, where the radiant exitance due to subsurface scattering of an object in the image is computed without the re-use of subsurface scattering contributions. Column 750 lists the time in seconds for a beauty pass of an image in column 710, where the radiant exitance due to subsurface scattering of an object in the image is computed by re-using subsurface scattering contributions in accordance with the method 400. The observed speed-up factor between column 740 and 750 ranges from 1.37× to 1.99×. Overall, the innovations described in this disclosure can be employed to yield a roughly four to eight fold speed increase in the evaluation of the radiant exitance due to subsurface scattering compared with a prior implementation, translating into as much as a halving of the overall rendering time for shots in animated motion pictures.

These techniques are well-suited for film VFX production because they produce temporally coherent images that are virtually indistinguishable from the results computed using previous implementations.

It should be appreciated that the results discussed above are exemplary results and not intended to limit the scope of the subject matter described in this disclosure. Rather, different results may be achieved in accordance with the subject matter in this disclosure. For example, different results may be achieved based on how aggressively previously computed subsurface scattering contributions are reused.

Figure 8:
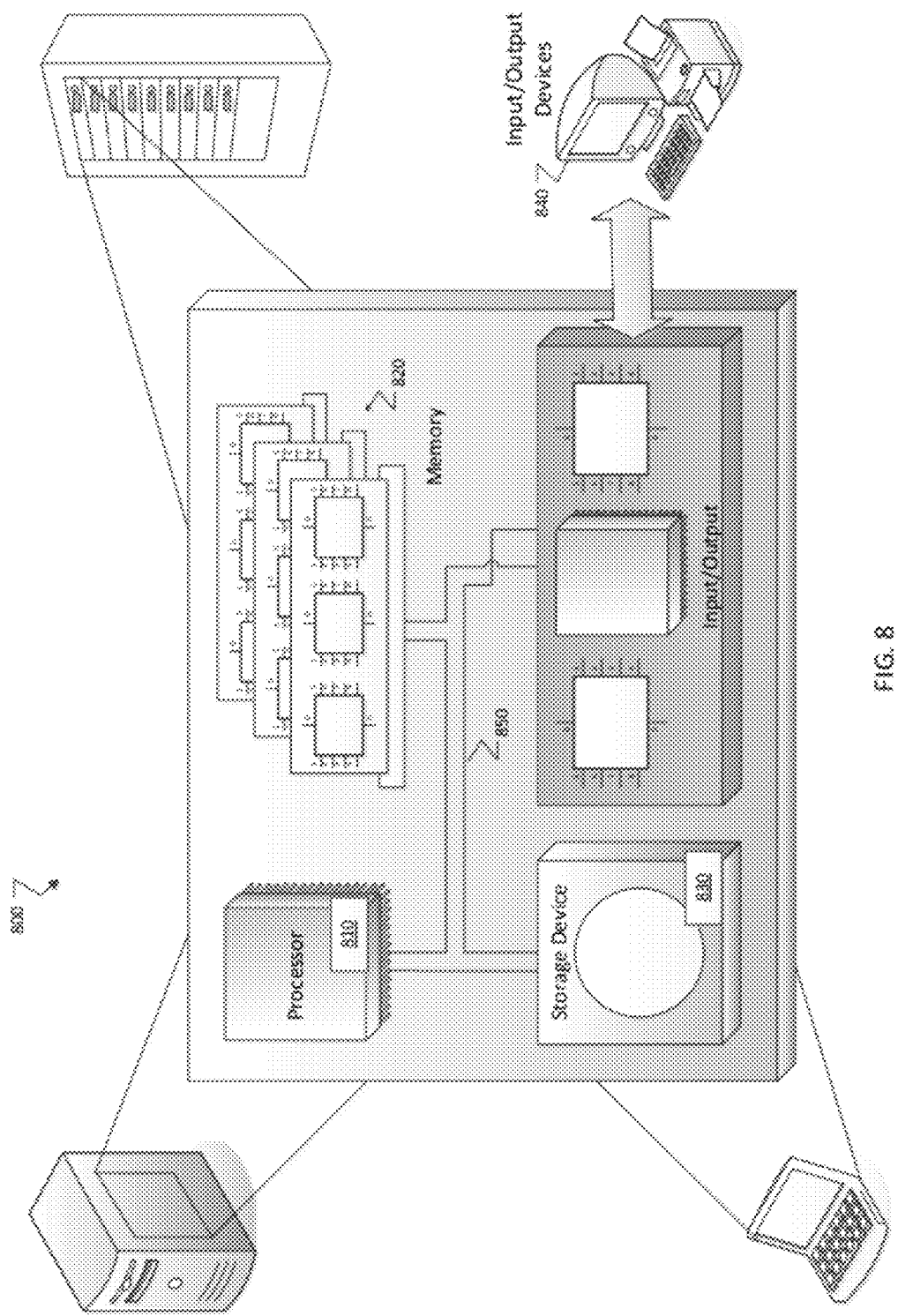
FIG. 8 is a schematic diagram of an exemplary computing system.

FIG. 8 is schematic diagram of an exemplary computing system 800. The system 800 may be used to perform the methods 100, 200, 400, and 600 described above, according to some implementations. The system 800 may be included in computer systems that compute radiant exitance due to subsurface scattering for translucent objects.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In some implementations, the processor 810 is a single-threaded processor. In some implementations, the processor 810 may be a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 830. In some implementations, the storage device 830 is a computer-readable medium. In various different implementations, the storage device 830 may be a floppy disk device, a hard disk device, an optical disk device, or a tape device.

The input/output device 840 provides input/output operations for the system 800. In some implementations, the input/output device 840 can include a keyboard, a pointing device (e.g., a mouse), and a 3D motion controller. In some implementations, the input/output device 840 includes a display unit for displaying graphical user interfaces.

The features described in this disclosure can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A compute program is a set of instruction that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessor, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disk; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected to any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made. For example, while the examples described herein discuss the use of the dipole diffusion approximation for estimating the subsurface scattering contribution from one shading sample onto another shading sample, it should be understood that any suitable technique for calculating or estimating subsurface scattering contributions can be used in place of or in connection with the dipole diffusion approximation.

In some examples an octree data structure is described where the octree is comprised of a root node, child nodes, and leaf nodes. In addition, some examples describe the leaf nodes of the octree data structure as being associated with a single shading sample, or pre-pass shading sample. It should be appreciated that, in alternative implementations, a leaf node in an octree data structure may include any number of suitable individual shading samples or pre-pass shading samples. In such implementations, evaluation of radiant exitance can still be performed in accordance with the methods described above.

In some implementations, a solid angle subtended by two-final pass shading samples is compared to a threshold value to determine whether a previously calculated subsurface scattering contribution should be reused. However, other implementations are envisioned to determine whether a previously calculated subsurface scattering contribution should be reused. For example, a previously calculated subsurface scattering contribution can be reused based on the distance between two final-pass shading samples, the distance between a final-pass shading sample and a region currently under evaluation for a subsurface scattering contribution, or any other suitable technique for determining whether a previously calculated subsurface scattering contribution should be reused.

In addition, other steps may be provided, or steps may be eliminated, from the described flowcharts, and other components may be added to, or removed from, the described systems. Accordingly, other implementations are within the scope of the following claims.

What is claimed is:

1. A method performed by one or more processes executing on a computer system, the method comprising:
    distributing a plurality of sample points across the surface of a three-dimensional (3D) object model to be rendered into a portion of a two-dimensional (2D) image;
    constructing a hierarchical data structure based on a first subset of the plurality of sample points, the hierarchical data structure comprising a plurality of nodes wherein:
        one node is a root node;
        each leaf node is associated with a pre-pass shading sample; and
        each non-leaf node is associated with a cluster of pre-pass shading samples; and
    determining a total radiant exitance for a final pass shading sample under evaluation (FPSS-UE) based on the hierarchical data structure by at least:
        recursively traversing the nodes of the hierarchical data structure starting at the root node;
        at a particular node within the traversal, determining a first solid angle, measured with respect to a position associated with the particular node, between a position associated with the FPSS-UE and a position associated with a final pass shading sample stored (FPSS-S) with the particular node for which a subsurface scattering contribution has been previously determined;
        determining a first threshold value in part by applying a luminosity function to an incident irradiance associated with the particular node; and
        depending on the determined first solid angle relative to the first threshold value, selectively either: (1) when the first solid angle is less than the first threshold value, adding the previously determined subsurface scattering contribution stored with the particular node to the total radiant exitance for the FPSS-U, or (2) when the first solid angle is greater than or equal to the first threshold value, estimating a newly determined subsurface scattering contribution corresponding to the particular node, storing the newly determined subsurface scattering contribution corresponding to the particular node in association with the hierarchical data structure, and adding the newly determined subsurface scattering contribution to the total radiant exitance for the FPSS-UE.

2. The method of claim 1 wherein if the first solid angle is less than the first threshold value, the FPSS-UE obtained by adding the previously determined subsurface scattering contribution associated with the particular node to the total radiant exitance is used for rendering the portion of the 2D image.

3. The method of claim 1 wherein if the first solid angle is greater than or equal to the first threshold value, the FPSS-UE obtained by adding the newly determined subsurface scattering contribution to the total radiant exitance is used for rendering the portion of the 2D image.

4. The method of claim 1 wherein the first threshold value is determined in part by using a significance value of the particular node.

5. The method of claim 1 wherein the hierarchical data structure is an octree data structure and wherein:
    each node in the octree includes data associated with at least a first sample point in the first subset of the plurality of sample points; and
    a non-leaf node in the octree represents a region on the 3D object model.

6. The method of claim 5 wherein the previously determined subsurface scattering contribution for the region represented by the non-leaf node was partially determined by using a position in 3D space for the first sample point, and the non-leaf node representing the region includes the previously determined subsurface scattering contribution for the region and the position in 3D space for the first sample point.

7. The method of claim 6 further comprising:
    replacing the previously determined subsurface scattering contribution included in the non-leaf node representing the region with the newly determined subsurface scattering contribution, wherein the newly determined subsurface scattering contribution for the region is partially determined by using a position in 3D space for a second sample point; and
    replacing the position in 3D space for the first sample point included in the non-leaf node representing the region with the position in 3D space for the second sample point.

8. The method of claim 7 wherein the subset of the plurality of sample points is a pre-pass subset of the plurality of sample points and the first sample point and the second sample point are part of a final-pass subset of the plurality of sample points.

9. The method of claim 5 further comprising:
    allocating memory to store the octree data structure in the memory as a flattened octree data structure, wherein the flattened octree data structure organizes child nodes close to their parents within a single contiguous memory block.

10. The method of claim 1 further comprising rendering the 3D object model into a pair of complimentary 2D stereoscopic images.

11. The method of claim 1 further comprising:
    determining, at the particular node within the traversal, if the particular node is not a leaf node;
    in the case that the particular node is not a leaf node, computing a preliminary solid angle and comparing the preliminary solid angle to a preliminary solid angle limit;
    in the case that the preliminary solid angle equals or exceeds the preliminary solid angle limit, recursively visiting the child nodes of the particular node; and
    in the case that the preliminary solid angle is less the preliminary solid angle limit, determining the first solid angle.

12. A computer program product, encoded on a non-transitory computer-readable medium, operable to cause a data processing apparatus to perform operations comprising:
    distributing a plurality of sample points across the surface of a three-dimensional (3D) object model to be rendered into a portion of a two-dimensional (2D) image;
    constructing a hierarchical data structure based on a first subset of the plurality of sample points, the hierarchical data structure comprising a plurality of nodes wherein:
        one node is a root node;
        each leaf node is associated with a pre-pass shading sample; and
        each non-leaf node is associated with a cluster of pre-pass shading samples; and
    determining a total radiant exitance for a final pass shading sample under evaluation (FPSS-UE) based on the hierarchical data structure by at least:
        recursively traversing the nodes of the hierarchical data structure starting at the root node;
        at a particular node within the traversal, determining a first solid angle, measured with respect to a position associated with the particular node, between a position associated with the FPSS-UE and a position associated with a final pass shading sample stored (FPSS-S) with the particular node for which a subsurface scattering contribution has been previously determined;
        determining a first threshold value in part by applying a luminosity function to an incident irradiance associated with the particular node; and
        depending on the determined first solid angle relative to the first threshold value, selectively either: (1) when the first solid angle is less than the first threshold value, adding the previously determined subsurface scattering contribution stored with the particular node to the total radiant exitance for the FPSS-UE, or (2) when the first solid angle is greater than or equal to the first threshold value, estimating a newly determined subsurface scattering contribution corresponding to the particular node, storing the newly determined subsurface scattering contribution corresponding to the particular node in association-with the hierarchical data structure, and adding the newly determined subsurface scattering contribution to the total radiant exitance for the FPSS-UE.

13. The computer program product of claim 12 wherein if the first solid angle is less than the first threshold value, the FPSS UE obtained by adding the previously determined subsurface scattering contribution to the total radiant exitance is used for rendering the portion of the 2D image.

14. The computer program product of claim 12 wherein if the first solid angle is greater than or equal to the first threshold value, the final pass shading sample obtained by adding the newly determined subsurface scattering contribution to the total radiant exitance is used for rendering the portion of the 2D image.

15. The computer program product of claim 12 wherein the first threshold value is determined in part by using a significance value of the node.

16. The computer program product of claim 12 wherein the hierarchical data structure is an octree data structure and wherein:
   each node in the octree includes data associated with at least a first sample point in the first subset of the plurality of sample points; and
   a non-leaf node in the octree represents a region on the 3D object model.

17. The computer program product of claim 16 wherein the previously determined subsurface scattering contribution for the region represented by the non-leaf node was partially determined by using a position in 3D space for the first sample point, and the non-leaf node representing the region includes the previously determined subsurface scattering contribution for the region and the position in 3D space for the first sample point.

18. The computer program product of claim 17 further comprising:
   replacing the previously determined subsurface scattering contribution included in the non-leaf node representing the region with the newly determined subsurface scattering contribution, wherein the newly determined subsurface scattering contribution for the region is partially determined by using a position in 3D space for a second sample point; and
   replacing the position in 3D space for the first sample point included in the non-leaf node representing the region with the position in 3D space for the second sample point.

19. The computer program product of claim 18 wherein the subset of the plurality of sample points is a pre-pass subset of the plurality of sample points and the first sample point and the second sample point are part of a final-pass subset of the plurality of sample points.

20. The computer program product of claim 16 further comprising:
   allocating memory to store the octree data structure in the memory as a flattened octree data structure, wherein the flattened octree data structure organizes child nodes close to their parents within the single contiguous memory block.

21. The computer program product of claim 12 further comprising rendering the 3D object model into a pair of complimentary 2D stereoscopic images.

22. The computer-program product of claim 12 wherein the operations further comprise:
   determining, at the particular node within the traversal, if the particular node is not a leaf node;
   in the case that the particular node is not a leaf node, computing a preliminary solid angle and comparing the preliminary solid angle to a preliminary solid angle limit;
   in the case that the preliminary solid angle equals or exceeds the preliminary solid angle limit, recursively visiting the child nodes of the particular node; and
   in the case that the preliminary solid angle is less the preliminary solid angle limit, determining the first solid angle.

23. A system comprising:
   a processor: and
   a computer program product encoded on a non-transitory computer-readable medium, the computer program product configured to cause the processor to perform the operations comprising:
      distributing a plurality of sample points across the surface of a three-dimensional (3D) object model to be rendered into a portion of a two-dimensional (2D) image;
      constructing a hierarchical data structure over a first subset of the plurality of sample points, the hierarchical data structure comprising a plurality of nodes wherein:
         one node is a root node;
         each leaf node is associated with a pre-pass shading sample; and
         each non-leaf node is associated with a cluster of pre-pass shading samples; and
      determining a total radiant exitance for a final pass shading sample under evaluation (FPSS-UE) based on the hierarchical data structure by at least:
         recursively traversing the nodes of the hierarchical data structure starting at the root node;
         at a particular node within the traversal, determining a first solid angle, measured with respect to a position associated with the particular node, between a position associated with the FPSS-UE and a position associated with a final pass shading sample stored (FPSS-S) with the particular node for which a subsurface scattering contribution has been previously determined;
         determining a first threshold value in part by applying a luminosity function to an incident irradiance associated with the particular node; and
         depending on the determined first solid angle relative to the first threshold value, selectively either: (1) when the first solid angle is less than the first threshold value, adding the previously determined subsurface scattering contribution stored with the particular node to the total radiant exitance for the FPSS-UE, or (2) when the first solid angle is greater than or equal to the first threshold value, estimating a newly determined subsurface scattering contribution corresponding to the particular node, storing the newly determined subsurface scattering contribution corresponding to the particular node in association with the hierarchical data structure, and adding the newly determined subsurface scattering contribution to the total radiant exitance for the FPSS-U E.

24. The system of claim 23 wherein if the first solid angle is less than the first threshold value, the FPSS-UE obtained by adding the previously determined subsurface scattering contribution associated with the particular node to the total radiant exitance is used for rendering the portion of the 2D image.

25. The system of claim 23 wherein if the first solid angle is greater than or equal to the first threshold value, the FPSS-UE obtained by adding the newly determined subsurface scattering contribution to the total radiant exitance is used for rendering the portion of the 2D image.

26. The system of claim 23 wherein the first threshold value is determined in part by using a significance value of the particular node.

27. The system of claim 23 wherein the hierarchical data structure is an octree data structure and wherein:
   each node in the octree includes data associated with at least a first sample point in the first subset of the plurality of sample points; and
   a non-leaf node in the octree represents a region on the 3D object model.

28. The system of claim 27 wherein the previously determined subsurface scattering contribution for the region represented by the non-leaf node was partially determined by using a position in 3D space for the first sample point, and the non-leaf node representing the region includes the previously determined subsurface scattering contribution for the region and the position in 3D space for the first sample point.

29. The system of claim 27 further comprising:
replacing the previously determined subsurface scattering contribution included in the non-leaf node representing the region with the newly determined subsurface scattering contribution, wherein the newly determined subsurface scattering contribution for the region is partially determined by using a position in 3D space for a second sample point; and
replacing the position in 3D space for the first sample point included in the non-leaf node representing the region with the position in 3D space for the second sample point.

30. The system of claim 29 wherein the subset of the plurality of sample points is a pre-pass subset of the plurality of sample points and the first sample point and the second sample point are part of a final-pass subset of the plurality of sample points.

31. The system of claim 27 further comprising:
allocating memory to store the octree data structure in the memory as a flattened octree data structure, wherein the flattened octree data structure organizes child nodes close to their parents within a single contiguous memory block.

32. The system of claim 23 further comprising rendering the 3D object model into a pair of complimentary 2D stereoscopic images.

33. The system of claim 23 wherein the operations further comprise:
determining, at the particular node within the traversal, if the particular node is not a leaf node;
in the case that the particular node is not a leaf node, computing a preliminary solid angle and comparing the preliminary solid angle to a preliminary solid angle limit;
in the case that the preliminary solid angle equals or exceeds the preliminary solid angle limit, recursively visiting the child nodes of the particular node; and
in the case that the preliminary solid angle is less the preliminary solid angle limit, determining the first solid angle.

34. A method performed by one or more processes executing on a computer system, the method comprising:
distributing a plurality of sample points across the surface of a three-dimensional (3D) object model to be rendered into a portion of a two-dimensional (2D) image;
constructing a hierarchical octree data structure based on a first subset of the plurality of sample points, the octree data structure comprising a plurality of nodes wherein:
one node is a root node;
each node in the octree is associated with at least one of the sample points in the first subset;
each leaf node comprises a pre-pass shading sample;
each non-leaf node comprises a cluster of pre-pass shading samples; and
a non-leaf node in the octree represents a region on the 3D object, wherein the non-leaf node representing the region includes a previously determined subsurface scattering contribution and a position of a first sample point used in the determination of the previously determined subsurface scattering contribution, the first sample point being from a second subset of the plurality of sample points; and determining a total radiant exitance for a final pass shading sample under evaluation (FPSS-UE) based on the hierarchical data structure by at least:
recursively traversing the nodes of the hierarchical octree data structure starting at the root node;
at a particular node within the transversal, determining a first solid angle, measured with respect to a position associated with the particular node, between a position associated with the FPSS-UE and a position associated with a final pass shading sample stored (FPSS-S) with the particular node for which a subsurface scattering contribution has been previously determined;
determining a first threshold value in part by applying a luminosity function to an incident irradiance associated with the region;
depending on the determined first solid angle relative to the first threshold value, selectively either: (1) when the first solid angle is less than the first threshold value, adding the previously determined subsurface scattering contribution to the total radiant exitance for the FPSS-UE, or (2) when the first solid angle is greater than or equal to the first threshold value, estimating a newly determined subsurface scattering contribution corresponding to the particular node, storing the newly determined subsurface scattering contribution corresponding to the particular node in association with the hierarchical data structure, and adding the newly determined subsurface scattering contribution to the total radiant exitance for the FPSS-UE.

35. The method of claim 34 wherein the first subset of the plurality of sample points is a set of pre-pass sample points and the second subset of the plurality of sample points is set of final-pass sample points.

36. The method of claim 34 further comprising:
if the first solid angle is greater than or equal to the first threshold value:
determining the newly determined subsurface scattering contribution using the second sample point;
using the newly determined subsurface scattering contributing for rendering the portion of the 2D image; and
replacing, in the non-leaf node representing the region, the previously determined subsurface scattering contribution with the newly determined subsurface scattering contribution and the position of the first sample point with a position of the second sample point.

37. The method of claim 34 wherein if the first solid angle is less than the threshold value, the previously determined subsurface scattering contribution is-used for rendering the portion of the 2D image.

38. The method of claim 34 further comprising:
allocating memory to store the octree data structure in the memory as a flattened octree data structure, wherein the flattened octree data structure organizes child nodes close to their parents within a single contiguous memory block.

39. The method of claim 34 further comprising:
determining, at the particular node within the traversal, if the particular node is not a leaf node;
in the case that the particular node is not a leaf node, computing a preliminary solid angle and comparing the preliminary solid angle to a preliminary solid angle limit;
in the case that the preliminary solid angle equals or exceeds the preliminary solid angle limit, recursively visiting the child nodes of the particular node; and in the case that the preliminary solid angle is less the preliminary solid angle limit, determining the first solid angle.

* * * * *

UNITED STATES PATENT AND TRADEMARK OFFICE
CERTIFICATE OF CORRECTION

PATENT NO.         : 9,070,208 B2
APPLICATION NO.    : 13/118315
DATED              : June 30, 2015
INVENTOR(S)        : Charlie A. Kilpatrick et al.

Page 1 of 1

It is certified that error appears in the above-identified patent and that said Letters Patent is hereby corrected as shown below:

IN THE CLAIMS

In Claim 13, column 16, lines 59, please delete the words "FPSS UE" and insert the hyphenate word --FPSS-UE-- so that the line reads:

FPSS-UE obtained by adding the previously determined sub-

In Claim 29, column 19, lines 6, please delete the words "claim 27" and insert the words --claim 28-- so that the line reads:

The system of claim 28 further comprising:

Signed and Sealed this
Seventeenth Day of November, 2015

Michelle K. Lee
*Director of the United States Patent and Trademark Office*